United States Patent
Arima et al.

[11] Patent Number: 5,454,057
[45] Date of Patent: Sep. 26, 1995

[54] METHOD FOR FABRICATING STAR COUPLER FOR INTERCONNECTING OPTICAL FIBERS AND A STAR COUPLER

[75] Inventors: Tadao Arima; Koji Okamura, both of Kawasaki, Japan

[73] Assignee: Fujitsu Limited, Kawasaki, Japan

[21] Appl. No.: 297,786

[22] Filed: Aug. 30, 1994

[30] Foreign Application Priority Data

Mar. 15, 1994 [JP] Japan .................. 6-043870

[51] Int. Cl.⁶ ........................................ G02B 6/255
[52] U.S. Cl. .................. 385/46; 385/43; 385/51
[58] Field of Search .................. 385/39, 43, 45, 385/46, 48, 50, 51

[56] References Cited

U.S. PATENT DOCUMENTS

| | | | |
|---|---|---|---|
| 4,008,061 | 2/1977 | Ramsay | 385/43 X |
| 4,360,248 | 11/1982 | Bickel et al. | 385/46 |
| 4,801,185 | 1/1989 | Bricheno | 385/51 X |
| 4,869,570 | 9/1989 | Yokohama et al. | 385/43 X |
| 5,129,021 | 7/1992 | Mortimore et al. | 385/46 |
| 5,309,536 | 5/1994 | Suganuma et al. | 385/43 |

FOREIGN PATENT DOCUMENTS

57-169719 10/1982 Japan .
63-129307 6/1988 Japan .
63-311211 12/1988 Japan .
1-93706 4/1989 Japan .

*Primary Examiner*—John D. Lee
*Attorney, Agent, or Firm*—Armstrong, Westerman, Hattori, McLeland & Naughton

[57] ABSTRACT

A star coupler for interconnecting optical fibers to distribute optical signals. The method for fabricating the star coupler comprises the steps of preparing a tubular member and first and second groups of optical fibers having bare fiber portions extending from the ends. The bared fiber portions of the first and second groups of optical fibers are inserted into the tubular member, in the opposite directions, in an end-to-end abutting relationship. The contacting ends of the bared fiber portions are then molten and fused together. The fused fiber portions are finally stretched together with the tubular member. It is possible to preheat the tubular member at a relatively low temperature so that the tubular member shrinks relative to the bared fiber portions to retain the latter. The obtained star coupler comprises first and second groups of optical fibers inserted into a tubular member in an end-to-end abutment relationship, with the ends joined together. The tubular member has an inner surface in a generally polygonal shape.

14 Claims, 6 Drawing Sheets

METHOD FOR FABRICATING STAR COUPLER FOR INTERCONNECTING OPTICAL FIBERS AND A STAR COUPLER

BACKGROUND OF THE INVENTION

1. Field of the Invention

The present invention relates to a method for fabricating a star coupler, and a fabricated star coupler, for interconnecting a plurality of optical fibers to deliver and to distribute optical signals.

2. Description of the Related Art

In optical communication systems, star couplers are used for delivering and distributing optical signals. For example, a plurality of optical fibers are connected to the star coupler on the input side thereof, and an additionally plurality of optical fibers are connected to the star coupler on the output side thereof. A light propagating in one of the optical fibers on the input side is made incident to the star coupler and spreads into all the optical fibers on the output side to distribute optical signals.

There are star couplers of the waveguide type and star couplers of the fused optical fiber type. The star couplers of the waveguide type are fabricated separately from optical fibers, and must be subsequently connected to optical fibers. The star couplers of the fused optical fiber type are fabricated from optical fibers and can be advantageously and easily connected to other optical fibers with a small insertion loss.

The star coupler of fused optical fiber type is disclosed, for example, in Japanese Unexamined Patent Publication (Kokai) No. 1-93706. This star coupler is fabricated by the steps of bundling a plurality of optical fibers, heating the optical fibers to cause the optical fibers to be melted and fused together, and stretching the optical fibers.

The optical fibers usually consist of cores, clads, and coats and, when making the star coupler of the fused optical fiber type, it is necessary to partially remove the coats of the optical fibers to reveal bared fiber portions corresponding to the location of the star coupler. Otherwise, it is possible to use entirely coatless optical fibers for making the star coupler. However, the entirely coatless optical fibers are difficult to handle.

In the fabrication of the conventional star couplers of the fused optical fiber type, it is necessary to hold and handle a group of optical fibers using special tools. However, the use of the special tools requires a more complicated apparatus and a more complicated operation. In the method for fabricating a star coupler described in the above described prior art, a glass tube is used into which a group of optical fibers are inserted. The glass tube is then heated from the outside thereof so that the glass tube shrinks and the optical fibers are molten and fused together. The optical fibers with the glass tube are subsequently stretched. By using the glass tube, it is possible to retain the group of optical fibers in the glass tube. Light is confined within the glass tube, as it has a lower index of refraction, in order to prevent leakage of the light after stretching, and it is thus possible to reduce the insertion loss.

The method for fabricating a star coupler, described in this prior art, is adapted for use with coatless optical fibers, but it is not adapted for use with coated optical fibers. That is, it is difficult to handle optical fibers having no covers along the length thereof, and coated optical fibers must be prepared by partially removing the coats from the optical fibers so that bare fiber portions appear in the intermediate position of the optical fiber corresponding to the region where the star coupler is to be fabricated, with the covers maintained unremoved at the end portions of the optical fibers.

However, in order to insert optical fibers having the uncoated intermediate portions and the coated end portions into the glass tube, it is necessary to first insert the coated end portions of the optical fibers into the glass tube. The diameter of the covered end portion of the optical fiber is larger than the diameter of the uncoated intermediate portion of the optical fiber, so the glass tube must have a relatively large inner diameter to allow the covered end portions of the optical fibers to pass through the glass tube. Therefore, a gap between the glass tube and the uncoated intermediate portions of the optical fibers becomes large, with the result that the optical fibers are apt to move in the glass tube and to deform during the heating step before the glass tube sufficiently shrinks to hold the optical fibers in place. Therefore, the prior art suffers from the problems that optical fibers constituting the star coupler are not uniformly coupled and stretched, and it is not possible to reliably fabricate star couplers having uniform branching losses.

SUMMARY OF THE INVENTION

The object of the present invention is to provide a method for fabricating a star coupler by which it is possible to fabricate star couplers having uniform distribution losses and with small manufacturing variations between each coupler.

Another object of the present invention is to provide a star coupler fabricated by the above method.

According to the present invention, there is provided a method for fabricating a star coupler, said method comprising the steps of: preparing a tubular member having first and second opposite ends; preparing a first group of parallel optical fibers having respective ends and bare fiber portions extending from each end, and a second group of optical fibers having respective ends and bare fiber portions extending from each one end; inserting the bare fiber portions of the first group of optical fibers into the tubular member from the first end of the tubular member, and inserting the bare fiber portions of the second group of optical fibers into the tubular member from the second end of the tubular member, so that the ends of the bare fiber portions of the first group of optical fibers contact the ends of the bare fiber portions of the second group of optical fibers; heating the tubular member and the contacting ends of the bare fiber portions of the first and second groups of optical fibers to fuse the ends of the bare fiber portions of the first group of optical fibers with the ends of the bare fiber portions of the second group of optical fibers; and stretching the tubular member and the fused fiber portions of the first and second groups of optical fibers.

In this method, the bare fiber portions of the first and second groups of optical fibers extending from the respective one ends of the optical fibers comprise cores and clads, respectively, which are revealed from the coats. The size of the entire fiber portions of each of the first and second groups of optical fibers is smaller than that of the entire coated optical fibers of each of the first and second groups of optical fibers. The bare fiber portions of the first and second groups of optical fibers are inserted into the tubular member from opposite directions and into an end-to-end abutment relationship. The size of the hole in the tubular member is just slightly greater than that of the entire fiber portions of each of the first and second groups of optical fibers, and the bare fiber portions of the first and second groups of optical fibers are retained in the tubular member in position. In this condition, the ends of the bare fiber portions of the first group of optical fibers are fused with the ends of the bare fiber portions of the second group of optical fibers while heating the tubular member and contacting ends of the bared fiber portions. Then, the bare fiber portions of the first and second groups of optical fibers, together with the tubular member, are stretched. Thus all the bared fiber portions of the first and second groups of optical fibers are fused together, so that light incident on one of the optical fibers is propagated to all the optical fibers of the other group.

A star coupler, according to the present invention and adapted to be fabricated by the above described method, comprises: a tubular member having first and second opposite ends; a first group of parallel optical fibers each having one end and a bare fiber portion extending from each end, and a second group of parallel optical fibers each having one end and a bare fiber portion extending from each end; the bare fiber portions of the first group of optical fibers being inserted into the tubular member from the first end of the tubular member, and the bare fiber portions of the second group of optical fibers being inserted into the tubular member from the second end of the tubular member; the ends of the bared fiber portions of the first and second groups of optical fibers being fused together; and the fused, bared fiber portions of the first and second groups of optical fibers being heated and stretched together with the tubular member so that a light propagating in one of the optical fibers of one of the first and second groups can pass into all of the optical fibers of the other group.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
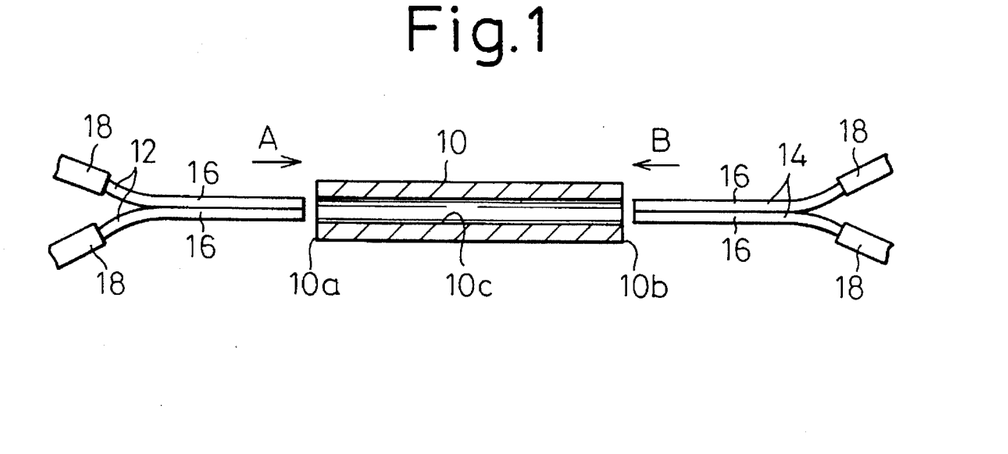
FIG. 1 is a cross-sectional view illustrating the first step of the method for fabricating the star coupler according to the embodiment of the present invention.
Figure 3:
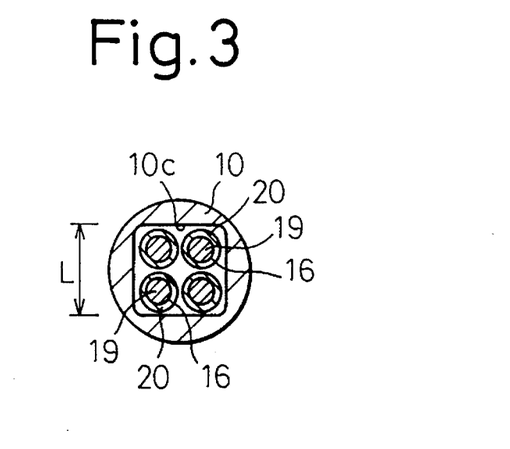
FIG. 3 is a cross-sectional view of the star coupler taken along the line III—III in FIG. 2.

FIG. 1 is a cross-sectional view illustrating the first step of the method for fabricating the star coupler according to the embodiment of the present invention. In the present invention, a tubular member 10, a first group of (four) parallel optical fibers 12, and a second group of (four) parallel optical fibers 14 are prepared. The tubular member 10 has a first end 10a, a second end 10b, and a through hole 10c extending from the first end 10a to the second end 10b. Each of the optical fibers 12 and 14 comprises a fiber portion 16 and a coat 18 coating the fiber portion 16. The fiber portion 16 comprises a core 19 and a clad 20, as shown in FIG. 3. The core 19 and the clad 20 are not shown in the other Figures, but it is to be understood that the fiber portion 16 comprises the core 19 and the clad 20 in those Figure.

Each of the optical fibers 12 and 14 has one end portion at which the coat 18 is removed and thus the fiber portion 16 is bare. The tubular member 10 is made from a material, such as Vycor glass, having a softening point near to that of quartz glass used for making the clad 20 and an index of refraction lower than that of quartz glass. It is possible to make the tubular member 10 from a material similar to the clad 20, such as quartz glass, and in this case, a film made from a material having an index of refraction lower than that of the clad 20 is applied to the tubular member 10. For example, a CVD glass film doped with B or F, or an alkyl silicate glass doped with B or F is applied to the inner surface of the quartz glass tubular member.

The bared fiber portions 16, at which the coats 18 are removed, of the first group of optical fibers 12 are inserted into the tubular member 10 from the first end 10a of the tubular member 10, as shown by the arrow A. Similarly, the bare fiber portions 16, at which the coats 18 are removed, of the second group of optical fibers 14 are inserted into the tubular member 10 from the second end 10b of the tubular member 10, as shown by the arrow B.

Figure 2:
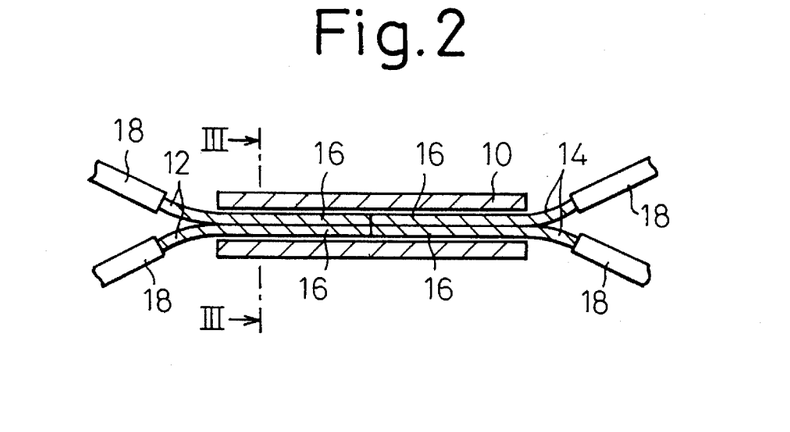
FIG. 2 is a cross-sectional view illustrating the second step after that in FIG. 1.

During this insertion, the ends of the bare fiber portions 16 of the first group of optical fibers 12 contact the ends of the bare fiber portions 16 of the second group of optical fibers 14 in the tubular member 10 in an end-to-end abutment relationship, as shown in FIG. 2. Preferably, an axially extending guiding shape is provided on the inner surface of the tubular member 10 (i.e., on the surface of the through hole 10c) so that the bared fiber portions 16 of the first group of optical fibers 12 align with the bared fiber portions 16 of the second group of optical fibers 14, respectively.

FIG. 3 is a cross-sectional view of the star coupler taken along the line III—III in FIG. 2. The guiding shape of the tubular member 10 comprises an approximately polygonal shape in the inner surface in cross-section. In this embodiment, each group includes four optical fibers 12 or 14, and the guiding shape of the tubular member 10 comprises an approximately square shape in cross-section, so that one of each group of optical fibers 12 or 14 extends in alignment with the corresponding one of the other group of optical fibers 12 or 14 along one inner corner of the square.

The size of the square shape in the tubular member 10 is slightly greater than that of the entire fiber portions 16 of each of the first and second groups of optical fibers 12 and 14 when inserted in the tubular member 10 and slightly smaller than that of the entire coated optical fibers 16 of each of the first and second groups of optical fibers 12 and 14 (i.e., the portions of the optical fibers 12 and 14 including the coats 18) in a similar disposition to the bare fiber portions 16. That is, in the embodiment, since the shape of the inner surface of the tubular member 10 is approximately a square, the size of the square shape in the inner surface of the tubular member 10 is represented by the distance L between the opposite sides of the square; the size of the entire fiber portions 16 of each of the first and second groups of optical fibers 12 and 14 is twice the diameter ($d_i$) of each clad 20; and the size of the entire coated optical fibers of each of the first and second groups of optical fibers 12 and 14 is twice the diameter ($d_o$) of each cover 20. There is a relationship of $d_i<L<d_o$. For example, the diameter ($d_i$) of each clad 20 is 125 μm, and the distance L between the opposite sides of the inner surface of the tubular member 10 is approximately 260 μm.

In the above described Japanese Unexamined Patent Publication (Kokai) No. 1-93706, only one group of optical fibers is used, and the end portions of the optical fibers include coats 18 which are not removed but the coats 18 are removed at an intermediate position of the optical fibers to expose bare fiber portions similar to portions 16. The optical fibers are inserted into a tubular member until the bared intermediate portions of the optical fibers face the tubular member. In this case, however, the aperture in the tubular member must have a size greater than the size of all the coated optical fibers, since one end portions of the optical fibers having the coats unremoved are first inserted into the tubular member. Therefore, a gap between the intermediate bare fiber portions of the optical fibers and the inner surface of the tubular member is relatively large, compared with the present invention.

According to the present invention, it is possible to design the tubular member 10 so that the size of the inner shape of the latter can be as small as possible, and accordingly, the bare fiber portions 16, at which the coats 18 are removed, of the first and second group of optical fibers 12 and 14 can be inserted into the tubular member 10 in a more closely contacting relationship with the inner surface of the through hole 10c of the tubular member 10, whereby the bare fiber portions 16 of the first and second group of optical fibers 12 and 14 can be accurately positioned and stably held in the through hole 10c of the tubular member 10.

Figure 4:
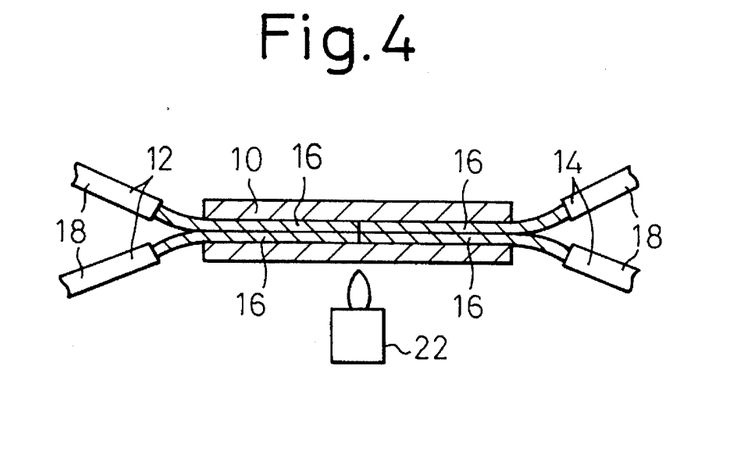
FIG. 4 is a cross-sectional view illustrating the third step after that in FIG. 2.

FIG. 4 shows the fabricating step that takes place after the fabricating step shown in FIG. 2. In this step, the tubular member 10 is heated by an oxyhydrogen burner 22 at a relatively low temperature at which the bare fiber portions 16 of the first and second groups of optical fibers 12 and 14 may not be substantially molten and fused to the tubular member 10, while the bare fiber portions 16 of the first and second groups of optical fibers 12 and 14 are urged toward each other. By this preliminary heating, the tubular member 10 shrinks relative to the bare fiber portions 16 of the first and second groups of optical fibers 12 and 14, and the gap between the bare fiber portions 16 of the first and second groups of optical fibers 12 and 14 and the tubular member 10 is reduced. Accordingly, the bare fiber portions 16 of the first group of optical fibers 12 are arranged accurately in line with the opposite bare fiber portions 16 of the second group of optical fibers 14.

Figure 5:
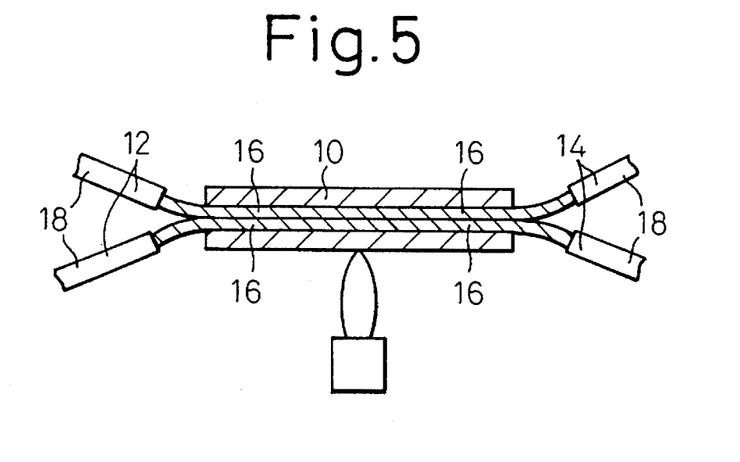
FIG. 5 is a cross-sectional view illustrating the fourth step after that in FIG. 4.

FIG. 5 shows the fabricating step after that in FIG. 4. In this step, the bare fiber portions 16 of the first and second groups of optical fibers 12 and 14 are heated along with the tubular member 10 by the oxyhydrogen burner 22, while the bare fiber portions 16 of the first and second groups of optical fibers 12 and 14 are urged toward each other. In this heating, the intensity of the oxyhydrogen burner 22 is raised, so as to cause the ends of the bared fiber portions 16 of the first and second groups of optical fibers 12 and 14 to be molten and joined together. The insertion light loss in this join is approximately 0.5 dB. In this step, the bare fiber portions 16 in at least one of the first and second groups of optical fibers 12 and 14 are also mutually joined. Usually, the bare fiber portions 16 in each of the first and second groups of optical fibers 12 and 14 are mutually fused. In addition, the bare fiber portions 16 of the first and second groups of optical fibers 12 and 14 are fused to the tubular member 10.

Figure 6:
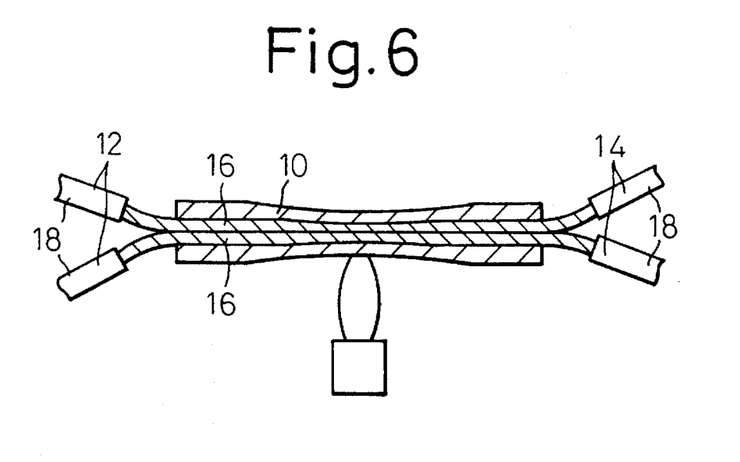
FIG. 6 is a cross-sectional view illustrating the fifth step after that in FIG. 5.

FIG. 6 shows the fabricating step after that in FIG. 5. In this step, the joined fiber portions 16 of the first and second groups of optical fibers 12 and 14 are stretched together with the tubular member 10. The joined fiber portions 16 of the first and second groups of optical fibers 12 and 14 include respective clads 20, as described above with reference to FIG. 3, and it is generally known that light propagating through the core 19 is confined in the clad 20 of one optical fiber so that the light cannot emerge laterally from the clad 20. However, if the clads 20 of the adjacent bared fiber portions 16 are molten and fused together and the thickness of the clads 20 is reduced by the stretching, it has been found that light propagating through the core 19 of one optical fiber 12 or 14 can pass through the clads 20 into the core 19 of the adjacent optical fiber 12. Therefore, light propagating through one of the first group of optical fibers 12 can pass through the fused region of the optical fiber 12 into all of the second group of optical fibers 14, and the light spreads into all of the second group of optical fibers 14. Similarly, light propagating through one of the second group of optical fibers 14 can pass through the fused region of the optical fiber 14 into all of the first group of optical fibers 12, and the light spreads into all of the first group of optical fibers 12. By making the tubular member 10 from a material having an index of refraction lower than that of quartz glass for making the clad 20, the tubular member 10 can function to prevent light from leaking from the fused region of the optical fibers 12 and 14, i.e., from the star coupler, in a manner similarly to the fundamental function of the clad in the optical fiber.

During the stretching step, the stretching is controlled, by inputting a light to one of the optical fibers (for example, one optical fiber 12) from an LED light source and by monitoring the outputs from optical detecting devices mounted to the optical fibers 14 in the other group. The stretching is completed when the outputs from all of the optical fibers 14 become approximately the identical values. In the obtained 4×4 star coupler, the excess loss was lower than 0.2 dB, and the difference in the loss between the ports was lower than 0.5 dB. In addition, the square shape of the inner surface of the tubular member 10 is maintained after the stretching.

FIGS. 7 to 10 respectively show modified tubular members 10.

Figure 7:
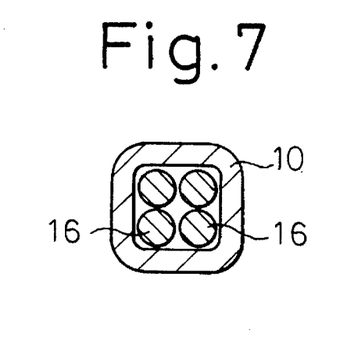
FIG. 7 is a cross-sectional view of a modified tubular member.

In FIG. 7, the tubular member 10 has an inner surface in a square shape and an outer surface in a correspondingly square shape.

Figure 8:
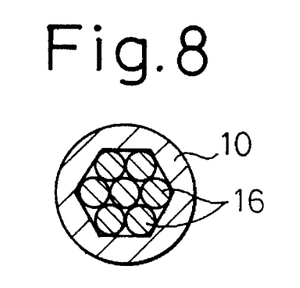
FIG. 8 is a cross-sectional view of a further modified tubular member.

In FIG. 8, the tubular member 10 has an inner surface in a hexagonal shape and seven fiber portions 16 of first and second group of optical fibers 12 and 14 can be inserted in the tubular member 10. Except for the central fiber portions 16, the remaining six fiber portions 16 extend along the inner corners of the hexagonal shape.

Figure 9:
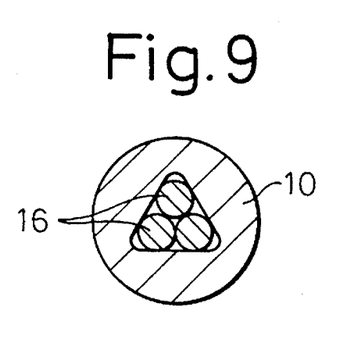
FIG. 9 is a cross-sectional view of a further modified tubular member.

In FIG. 9, the tubular member 10 has an inner surface in a triangular shape. The fiber portions 16 of first and second group of optical fibers 12 and 14 extend along the inner corners of the triangular shape.

Figure 10:
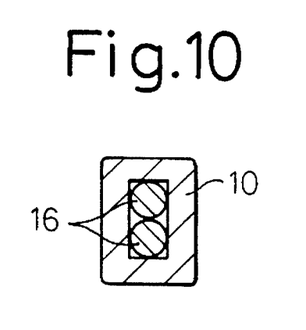
FIG. 10 is a cross-sectional view of a further modified tubular member.

In FIG. 10, the tubular member 10 has an inner surface in a rectangular shape, and two fiber portions 16 of first and second group of optical fibers 12 and 14 can be inserted in the tubular member 10. In each of the examples shown in FIGS. 7 to 10, the fiber portions 16 of first and second groups of optical fibers 12 and 14 comprise the core 19 and the clad 20, as described with reference to FIG. 3.

Although the polygonal shape of the inner surface of the tubular member 10 can be changed depending on the applications, the size of the polygonal shape in the inner surface of the tubular member 10 is slightly greater than that of the entire fiber portions 16 of each of the first and second groups of optical fibers 12 and 14 when inserted in the tubular member 10 and slightly smaller than that of the entire coated optical fibers 16 of each of the first and second groups of optical fibers 12 and 14 in a similar disposition to the bare fiber portions 16.

FIGS. 11A to 11C, 12A to 12D, and 13A to 13D show several examples for preparing the tubular member 10.

Figure 11A:
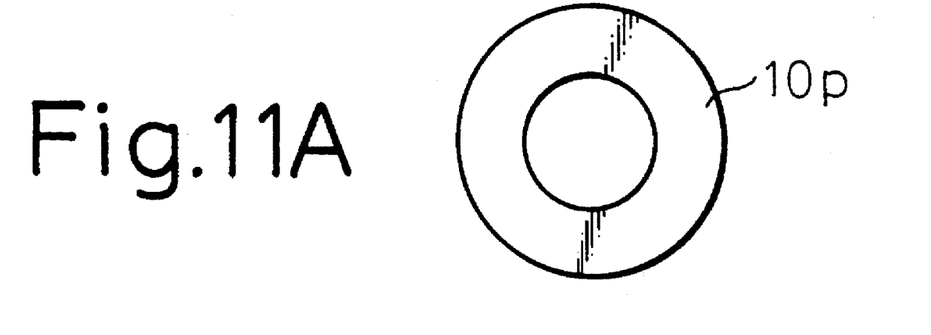
FIGS. 11A to 11C are views illustrating an example of the tubular member.
Figure 11B:
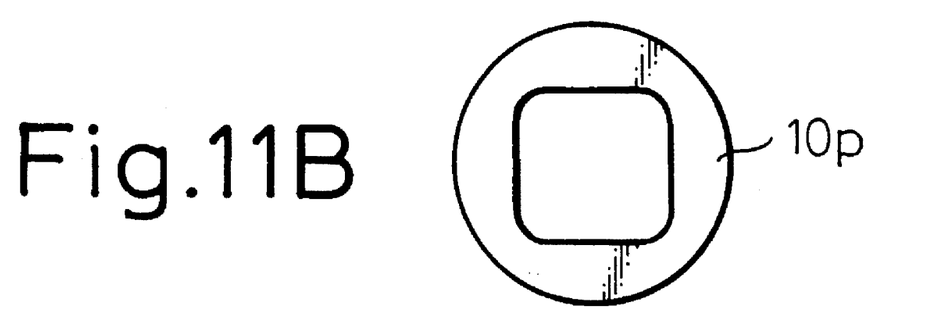
Figure 11C:
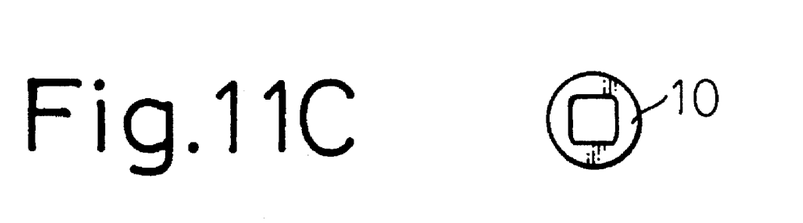

In the example shown in FIGS. 11A to 11C, a tubular blank 10p having a circular through hole and made from Vycor glass is prepared for making the tubular member 10 (FIG. 11A). The inner surface of the tubular blank 10p is then shaped into a generally polygonal shape by cutting or the like (FIG. 11B). The blank 10p is then stretched in an electric furnace to reduce the size of the blank 10p in cross section (FIG. 11C). The initial inner diameter of the blank 10p is 15 mm, and the final size of the inner surface of the blank 10p (and now of the tubular member 10) is 260 μm, which corresponds to the size used in the embodiment of FIG. 1. In the stretching operation, it is possible to obtain a tubular member 10 of the desired size by monitoring the outer diameter of the blank 10p and changing the stretching speed depending the outer diameter.

Figure 12A:
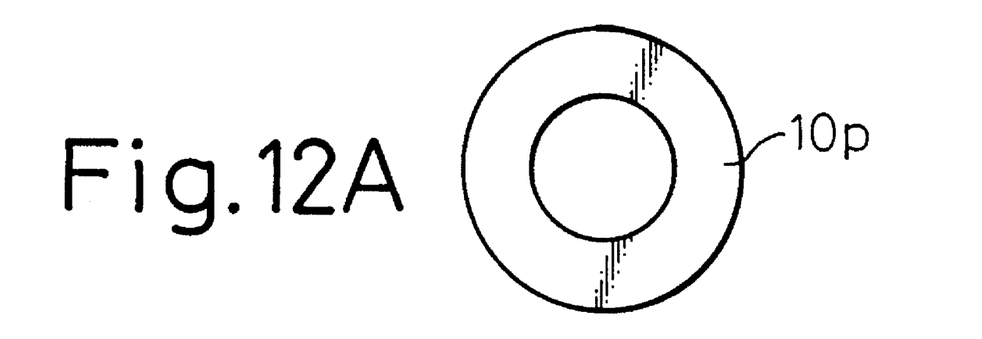
FIGS. 12A to 12D are views illustrating another example of the tubular member.
Figure 12B:
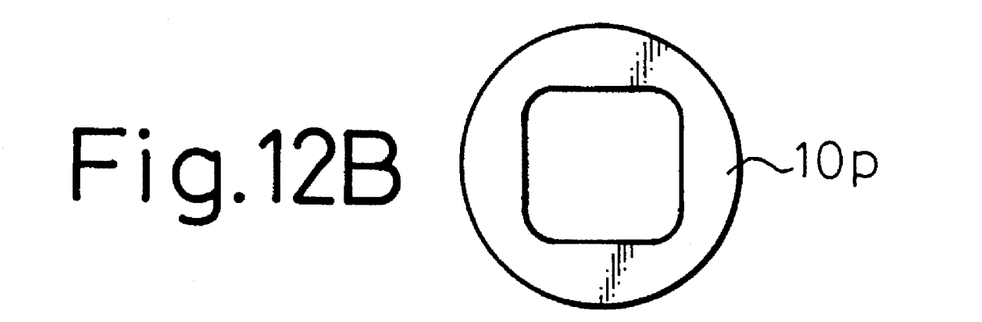
Figure 12C:
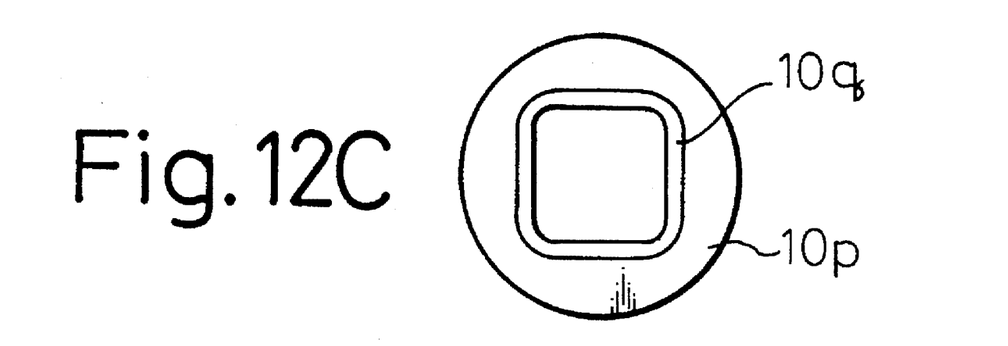
Figure 12D:
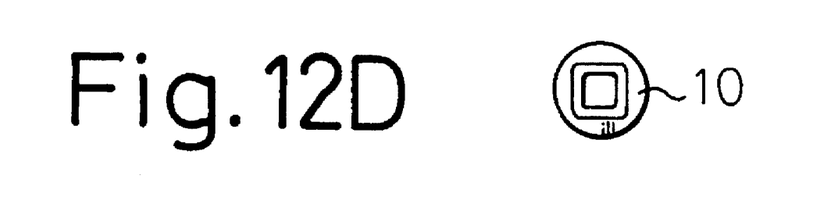

In the example shown in FIGS. 12A to 12D, a tubular blank 10p having a circular through hole and made from quartz glass is prepared for making the tubular member 10 (FIG. 12A). The inner surface of the tubular blank 10p is then shaped into a generally polygonal shape by cutting or the like (FIG. 12B). A film 10q made from a material having an index of refraction lower than that of the clad 20 of the optical fiber 12 or 14 to be used is then applied to the inner surface of the tubular blank 10p (FIG. 12C). The blank 10p is then stretched in an electric furnace to reduce the size of the blank 10p in cross section to obtain the tubular member 10 having the desired size (FIG. 12D).

Figure 13A:
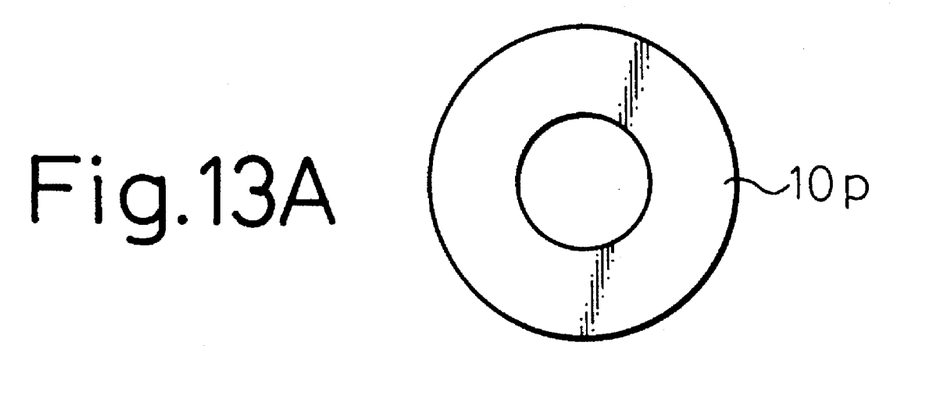
FIGS. 13A to 13D are views illustrating a further example of the tubular member.
Figure 13B:
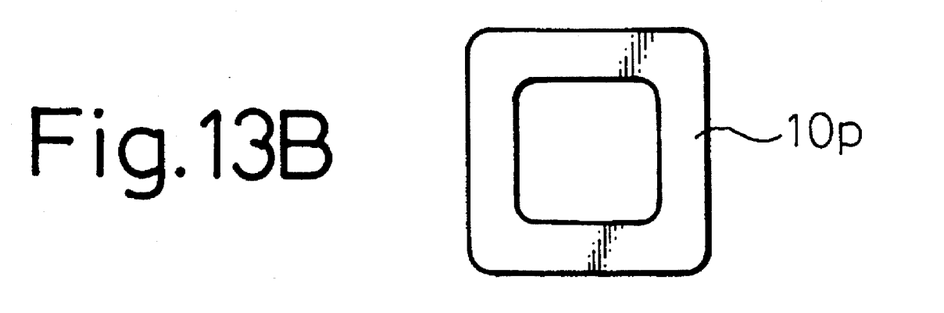
Figure 13C:
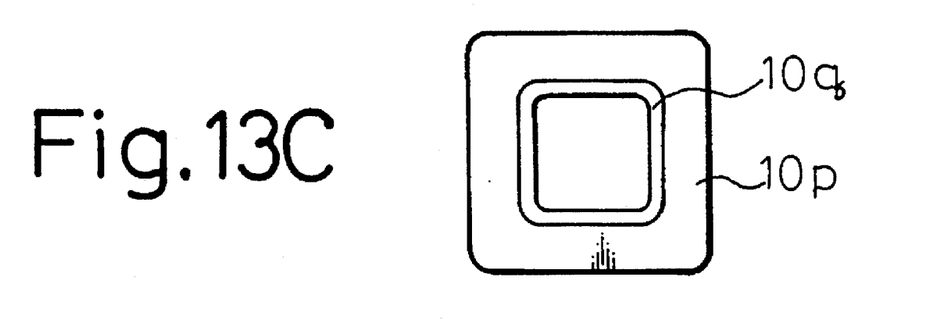
Figure 13D:
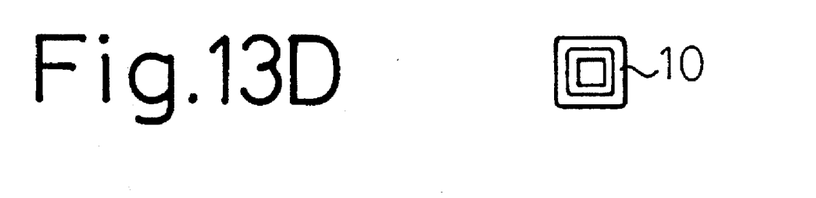

In the example shown in FIGS. 13A to 13D, a tubular blank 10p having a circular through hole and made from quartz glass is prepared for making the tubular member 10 (FIG. 13A). The inner and outer surfaces of the tubular blank 10p is then shaped into a generally polygonal shape (FIG. 13B). A film 10q made from a material having an index of refraction lower than that of the clad 20 of the optical fiber 12 or 14 to be used is then applied to the inner surface of the tubular blank 10p (FIG. 13C). The blank 10p is then stretched in an electric furnace to reduce the size of the blank 10p in cross-section to obtain the tubular member 10 having the desired size (FIG. 13D).

As explained in greater detail, according to the present invention, it is possible to obtain star couplers having a small excess loss and uniform distribution loss.

While the invention has been particularly shown and described in reference to preferred embodiments thereof, it will be understood by those skilled in the art that changes in form and details may be made therein without departing from the spirit and scope of the invention.

We claim:

1. A method for fabricating a star coupler, said method comprising the steps of:

preparing a tubular member having first and second opposite ends;

preparing a first group of parallel optical fibers having respective one ends and bare fiber portions extending from the respective one ends, and a second group of optical fibers having respective one ends and bare fiber portions extending from the respective one ends, wherein each of the bare fiber portions of the first and second groups of optical fibers has a core and a clad;

inserting the bare fiber portions of the first group of optical fibers into the tubular member from the first end of the tubular member, and inserting the bare fiber portions of the second group of optical fibers into the tubular member from the second end of the tubular member so that the ends of the bare fiber portions of the first group of optical fibers contact the ends of the bare fiber portions of the second group of optical fibers;

heating contacting ends of the bare fiber portions of the first and second groups of optical fibers to fuse the ends of the bare fiber portions of the first group of optical fibers with the ends of the bare fiber portions of the second group of optical fibers including the respective cores and clads thereof; and stretching the fused fiber portions of the first and second groups of optical fibers, including the respective cores and clads thereof, together with the tubular member.

2. A method according to claim 1, wherein the step of heating the ends of the bare fiber portions of the first and second groups of optical fibers includes mutually fusing the bare fiber portions in at least one of the first and second groups of optical fibers.

3. A method according to claim 1, further comprising the step of preheating the tubular member at a relatively low temperature at which the bare fiber portions of the first and second groups of optical fibers may not be substantially molten and fused to the tubular member, after the step of inserting the bare fiber portions into the tubular member and prior to the step of heating the ends of the bare fiber portions to join the ends of the bare fiber portions together.

4. A method according to claim 1, wherein the step of heating the ends of the bare fiber portions to fuse the ends of the bare fiber portions together comprises heating the tubular member while urging the bare fiber portions of the first and second groups of optical fibers toward each other.

5. A method according to claim 1, wherein the step of preparing the tubular member comprises providing an axially extending guiding shape in the inner surface of the tubular member so that the bare fiber portions of the first group of optical fibers align with the bare fiber portions of the second group of optical fibers.

6. A method according to claim 5, wherein the guiding shape comprises a polygonal inner surface shape in cross-section.

7. A method according to claim 1, wherein the tubular member is made from a material having an index of refraction lower than that of the clad.

8. A method according to claim 7, wherein the tubular member is made from Vycor glass.

9. A method according to claim 1, wherein each of the bare fiber portions of the first and second groups of optical fibers has a core and a clad, and a film made from a material having an index of refraction lower than that of the clad is applied to an inside portion of the tubular member.

10. A method according to claim 1, wherein the step of preparing the tubular member comprises preparing a tubular blank having an inner surface forming a circular through hole, shaping the inner surface of the blank into a generally polygonal shape, and stretching the blank to reduce the size of the blank in cross section.

11. A method according to claim 1, wherein the step of preparing the tubular member comprises preparing a tubular blank having an inner surface forming a circular through hole, shaping the inner surface of the blank into a generally polygonal shape, applying a film made from a material having an index of refraction lower than that of the clad of the optical fiber to be fused to the inner surface of the tubular blank, and stretching the blank to reduce the size of the blank in cross section.

12. A star coupler, comprising:

a tubular member having first and second opposite ends;

a first group of parallel optical fibers having ends and bare fiber portions extending from the respective ends, and a second group of parallel optical fibers having ends and bare fiber portions extending from the respective ends, wherein each of the bare fiber portions of the first and second groups of optical fibers has a core and a clad, the bare fiber portions of the first group of optical fibers being inserted into the tubular member from the first end of the tubular member, and the bare fiber portions of the second group of optical fibers being inserted into the tubular member from the second end of the tubular member, the ends of the bare fiber portions of the first and second groups of optical fibers, including the respective cores and clads thereof, being fused together, and the fused, bare fiber portions of the first and second groups of optical fibers, including the respective cores and clads thereof, being stretched, together with the tubular member so that light propagating through one of the optical fibers of one of the first and second groups can pass through all of the optical fibers of the other group.

13. A star coupler according to claim 12, wherein the tubular member has an inner surface in a generally polygonal shape so that the bare fiber portions of the first group of optical fibers and the bare fiber portions of the second group of optical fibers extend in an alignment with each other along respective inner corners of the polygon.

14. A star coupler according to claim 13, wherein the size of polygonal shape in the inner surface of the tubular member is slightly larger than the entire fiber portions of each of the first and second groups of optical fibers when inserted in the tubular member and slightly smaller than the entire coated optical fibers of each of the first and second groups of optical fibers in a similar disposition to the bare fiber portions.

* * * * *